US009467852B2

United States Patent
Thakur et al.

(10) Patent No.: US 9,467,852 B2
(45) Date of Patent: Oct. 11, 2016

(54) DETECTION OF NON-ENTITLEMENT OF A SUBSCRIBER TO A SERVICE IN COMMUNICATION NETWORKS

(75) Inventors: Raghuvamshi Thakur, Bangalore (IN); Chrisaman Sood, Gurgaon (IN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 14/371,517

(22) PCT Filed: Jan. 19, 2012

(86) PCT No.: PCT/EP2012/050778
§ 371 (c)(1),
(2), (4) Date: Jul. 10, 2014

(87) PCT Pub. No.: WO2013/107511
PCT Pub. Date: Jul. 25, 2013

(65) Prior Publication Data
US 2014/0357232 A1    Dec. 4, 2014

(51) Int. Cl.
*H04M 11/00* (2006.01)
*H04W 12/06* (2009.01)
*H04L 12/14* (2006.01)
(Continued)

(52) U.S. Cl.
CPC .......... *H04W 12/06* (2013.01); *H04L 12/1407* (2013.01); *H04L 12/1467* (2013.01); *H04M 15/61* (2013.01); *H04M 15/66* (2013.01); *H04M 15/83* (2013.01); *H04M 15/85* (2013.01); *H04M 15/852* (2013.01); *H04M 15/888* (2013.01); *H04W 48/02* (2013.01)

(58) Field of Classification Search
CPC ....... H04W 4/24; H04W 4/26; H04W 92/00; H04W 92/18; H04M 15/00; H04M 15/07; H04M 15/08; H04M 15/28; H04M 15/64; H04M 15/66

USPC ......... 455/405, 406, 407, 408, 556.1, 556.2, 455/557, 432.3, 434, 435.1
See application file for complete search history.

(56) References Cited

U.S. PATENT DOCUMENTS 8,027,659 B1 * 9/2011 Daly et al. ................. 455/404.1
2007/0036167 A1 * 2/2007 Hu .............................. 370/410
2007/0124254 A1 * 5/2007 Watson et al. ............... 705/77
(Continued)

FOREIGN PATENT DOCUMENTS

EP        1206111 A1      5/2002
WO    WO 2011/101066 A1   8/2011

OTHER PUBLICATIONS

International Search Report and Written Opinion dated Sep. 19, 2012 corresponding to International Patent Application No. PCT/EP2012/050778.

*Primary Examiner* — Jean Gelin
(74) *Attorney, Agent, or Firm* — Squire Patton Boggs (US) LLP (57) ABSTRACT

An apparatus and a method is proposed which are configured to store information about a certain status of a subscriber, to receive an authentication request for the subscriber via the interface, and to reject the authentication request for the subscriber in case the certain status of the subscriber is valid. Furthermore, an apparatus and a method are proposed which are configured to detect a certain status of a subscriber and to establish a notification including information about the certain status of the subscriber, and to send the notification to a network control element of the subscriber.

12 Claims, 6 Drawing Sheets

(51) Int. Cl.
*H04M 15/00* (2006.01)
*H04W 48/02* (2009.01)

(56) References Cited

U.S. PATENT DOCUMENTS

| | | | | |
|---|---|---|---|---|
| 2007/0185809 A1* | 8/2007 | Duan | ............. | G06Q 20/10 705/39 |
| 2007/0249342 A1* | 10/2007 | Huang | ............. | H04L 63/08 455/435.1 |
| 2008/0026724 A1* | 1/2008 | Zhang | ............. | H04L 63/08 455/411 |
| 2012/0099715 A1* | 4/2012 | Ravishankar | ....... | H04L 12/1407 379/114.01 |
| 2012/0101952 A1* | 4/2012 | Raleigh | ............. | G06Q 30/016 705/304 |
| 2012/0311335 A1* | 12/2012 | Fransen | ............. | H04L 63/06 713/170 |
| 2012/0320801 A1* | 12/2012 | Yang et al. | ............. | 370/259 |

\* cited by examiner

DETECTION OF NON-ENTITLEMENT OF A SUBSCRIBER TO A SERVICE IN COMMUNICATION NETWORKS

FIELD OF THE INVENTION

The present invention relates to apparatuses, system, methods and a computer program product for performing a detection of a non-entitlement of a subscriber to a service in communication networks.

RELATED BACKGROUND ART

The following meanings for the abbreviations used in this specification apply:
Ack Acknowledgement
CCA Credit Control Answer
CCR Credit Control Request
eNB enhanced Node-B
E-UTRAN Evolved Universal Terrestrial Radio Access Network
HSS Home Subscriber Server
IP Internet Protocol
IP-CAN Internet Protocol Connectivity Access Network
MME Mobility Management Entity
OCS Online charging system
PCS Policy Control System
PCEF Policy and Charging Enforcement Function
PCRF Policy Charging and Rules Function
P-GW Packet Data Network (PDN)-Gateway
PDP Packet Data Protocol
RRC Radio Resource Control
S-GW Serving Gateway
UE User Equipment Introduction of 3G and wide range of smart phones have substantially increased the number of PDP sessions in the network. However, the growth in the number of PDP context can't be attributed to increased network usage alone, since this is also dependent on the behaviour of the devices in the network. A current operator network analysis has indicated that a majority of the PDP context initiation is from the devices that may have unsuccessful PDP context creation. The reason could be that a subscriber may not be entitled for a certain service, as for example, due to the subscriber's low credit for such a service.

Some of the new generation phones, often referred to as smart phones, provide a mechanism to automatically keep retrying for PDP session establishments which might have failed in the first instance due to non-entitlement of the subscriber for a service. Such repeated re-trying to establish PDP sessions may create unnecessary signaling and increased load on network elements to handle session establishment procedures hampering network performance and efficiency.

SUMMARY OF THE INVENTION

Embodiments of the present invention address this situation and aim to reduce the signaling load on the network and processing load on network elements.

According to a first aspect of the present invention, an apparatus is provided which comprises an interface configured to provide connection to at least another network element, and a controller, wherein the controller is configured to store information about a certain status of a subscriber, to receive an authentication request for the subscriber via the interface, and to reject the authentication request for the subscriber in case the certain status of the subscriber is valid.

According to a second aspect of the present invention, an apparatus is provided which comprises an interface configured to provide connection to at least another network element, and a controller configured to detect a certain status of a subscriber and to establish a notification including information about the certain status of the subscriber, wherein the interface is configured to send the notification to a network control element of the subscriber.

According to a third aspect of the present invention, a method is provided which comprises storing information about a certain status of a subscriber, receiving an authentication request for the subscriber, and rejecting the authentication request for the subscriber in case the certain status of the subscriber is valid.

According to a fourth aspect of the present invention, a method is provided which comprises detecting a certain status of a subscriber, establishing a notification including information about the certain status of the subscriber, and sending the notification to a network control element of the subscriber.

BRIEF DESCRIPTION OF THE DRAWINGS

These and other objects, features, details and advantages will become more fully apparent from the following detailed description of embodiments of the present invention which is to be taken in conjunction with the appended drawings, in which.

DETAILED DESCRIPTION OF EMBODIMENTS

In the following, description will be made to embodiments of the present invention. It is to be understood, however, that the description is given by way of example only, and that the described embodiments are by no means to be understood as limiting the present invention thereto.

Before explaining embodiments of the present invention in more detail, first the problem underlying the present application is recaptured. As mentioned above, the introduction of 3G and wide range of smart phones have substantially increased the number of PDP sessions in the network, wherein a very large part of PDP context initiations is from devices that have an unsuccessful PDP context creation mostly due to subscriber's low credit. The current network architecture has credit validation only as the last leg. This leads to a wastage of operator network resources and high PDP request processing at various network elements.

Figure 4A:
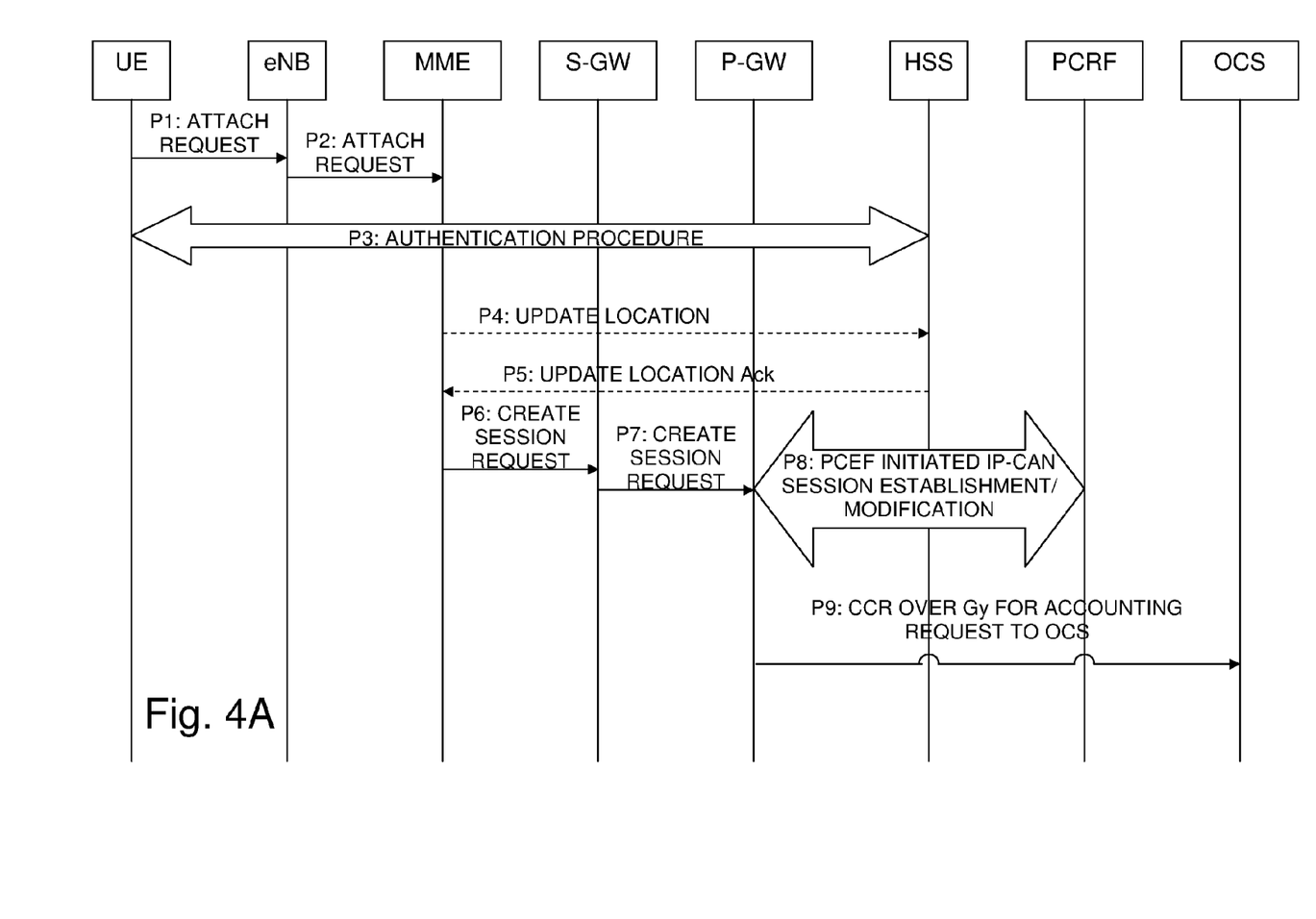
FIGS. 4A and 4B show a typical session setup and retry scenario.
Figure 4B:
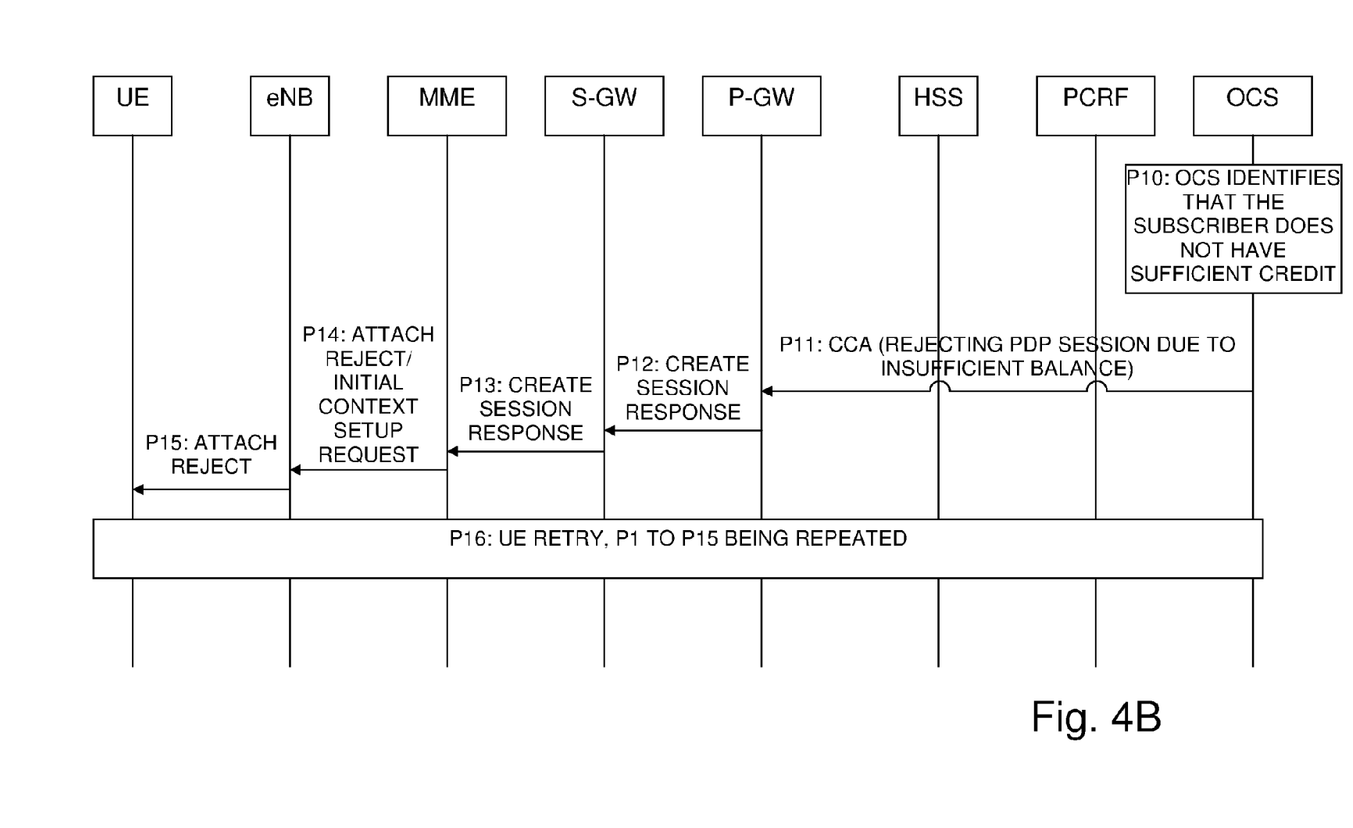

FIGS. 4A and 4B show a typical session setup and retry scenario in current network architecture, which is described in the following.

In P1, an UE sends an attach request to an eNB, which forwards the attach request to an MME. In response to this, an authentication procedure is carried out between a HSS and the UE in P3. If the authentication procedure was successful, the process continues with an update location in P4, which is sent from the MME to the HSS, which responds with an update location ack (acknowledgement) in P5. Thereafter, a create session request is sent from the MME to an S-GW in P6, which forwards the create session request to a P-GW in P7. Thereafter, a PCEF initiated IP-CAN session establishment (or modification) is carried out between the P-GW and a PCRF in P8. In P9, the P-GW sends a credit control request (CCR) to the OCS. In P10, the OCS identifies that the subscriber does have enough credit for the particular service. Hence, in P11 negative response, namely a credit control answer (CCA) rejecting the PDP session due to insufficient balance is sent to the P-GW. In P12, the P-GW sends a create session response to the S-GW, which is forwarded to the MME in P13, wherein the response indicates a rejection. Thus, in P14 the MME sends an attach reject/(initial contest setup request to the eNB, which in turn sends an attach reject message in P15 to the UE.

Thereafter, it is assumed that the subscriber tries again to request the service (or even another service for which credit is required). That is, in P16, the UE performs a retry. This involves that P1 to P15 are all repeated.

Thus, such repeated requests from the same user continue to execute the same call flow result into excessive PDP signaling load on the network elements. That is, the whole procedures P1 to P15 shown in FIGS. 4A and 4B would be repeated over again.

The a credit validation is done as part of PCS or OCS based on the network element responsible for volume accounting, namely in P9. That is, the credit validation is done by OCS/PCS as part of the last call processing step. So, all the PDP session creation handling by other network elements needs to be mandatorily preformed resulting into excessive network resource usage.

Thus, in order to overcome this problem, according to embodiments of the present invention a solution is proposed to have an early "credit exhausted" detection for optimization of the network.

That is, according to certain embodiments of the present invention, a new call flow is designed that allows a "credit exhausted" error code to be registered in HSS. This would allow early detection of "credit exhausted" error in the network as part of early authentication procedure, thus reducing the number of PDP session connection request that needs to be handled by the whole network. As HSS is involved in the early authentication procedures, HSS can be effectively used to reduce network overload and improve network efficiency.

Figure 1A:
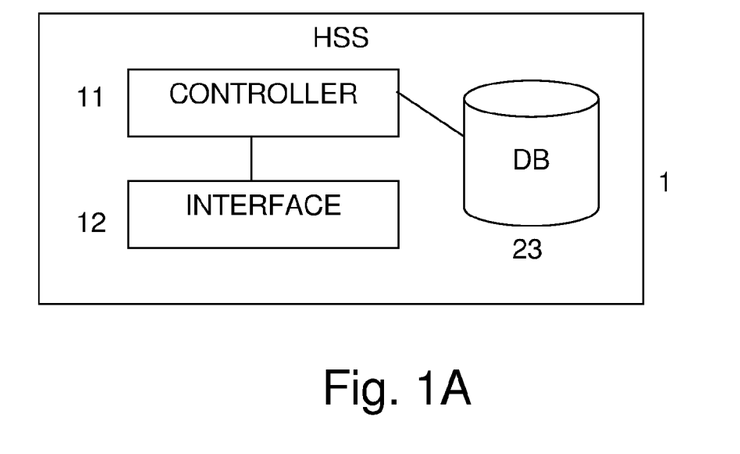
FIG. 1A shows an example for an OCS according to an embodiment of the present invention.

In the following, a general embodiment for a HSS (as an example for a corresponding apparatus or network control element) is described by referring to FIG. 1A.

In particular, a HSS 1 comprises an interface 12 configured to provide connection to at least another network element, and a controller 11. The controller 11 is configured to store information about a certain status of a subscriber, to receive an authentication request for a subscriber via the interface 12, and to reject the authentication request for the subscriber in case the certain status of the subscriber is valid.

Figure 1B:
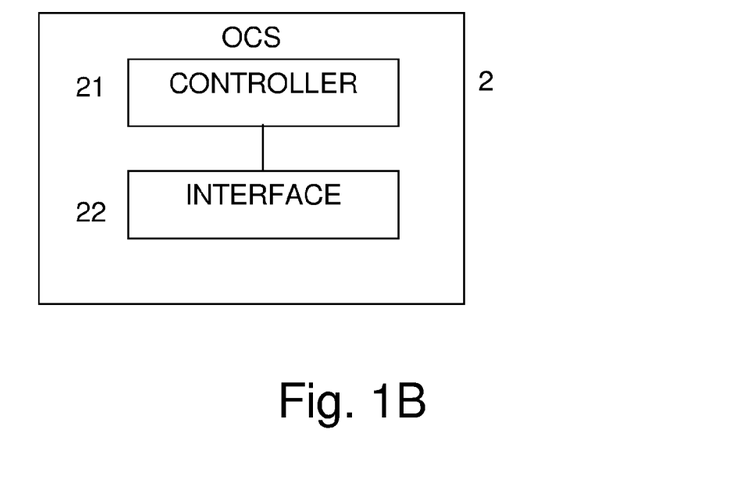
FIG. 1B shows an example for a HSS according to an embodiment of the present invention.

In the following, a general embodiment for an OCS 2 (as an example for a corresponding apparatus or an operator control node) is described by referring to FIG. 1B.

In particular the OCS 2 comprises an interface 22 configured to provide connection to at least another network element, and a controller 21. The controller 21 is configured to detect a certain status of a subscriber and to establish a notification including information about the certain status of the subscriber, wherein the interface 22 configured to send the notification to a network control element of the subscriber (e.g., the HSS shown in FIG. 1A).

The certain status of the subscriber may comprise a condition under which the subscriber is not entitled to use a certain service. For example, the certain status of the subscriber may be a condition that credit of the subscriber is exhausted, as described above.

This status can be detected by the OCS 2, and in such a case the OCS 2 sends a corresponding message to the HSS 1. The controller 11 of the HSS 1 may then register information about the certain status of the subscriber included in the message in a database (DB) 23 of the HSS.

Thus, in case the certain status (e.g., the "credit exhausted" status mentioned above) is valid for a particular subscriber requesting a service, the HSS 1 can already reject such a request, so that no further requests/messages in connection with setup for such a service would have to be carried out. The HSS knows this status since it receives a corresponding message from the OCS.

In the following some possible implementations of certain embodiments of the present invention are described.

On OCS/PCS detecting that the subscriber has exhausted all the credits, it shall continue by rejecting the subscriber PDP session.

OCS/PCS can then send a notification to HSS indicating the "credit exhausted" state of the subscriber.

HSS can store the error as part of the subscriber profile. On getting further request for subscriber authentication, HSS can additionally also consider the "credit exhausted" state of the subscriber. If the state is set, HSS can send negative authentication response for avoiding further PDP session processing.

On subscriber buying additional credits, PCS/OCS can then trigger HSS to remove the "credit exhausted" state flag for normal processing and authentication of the subscriber.

It is noted that the "Credit exhausted" status mentioned above does not only involve that the subscriber does not have any credit all. For example, there may certain service (e.g., video conferencing) for which the subscriber may not have enough credit, whereas he may have enough credit for some other service (e.g., voice calls).

Figure 2:
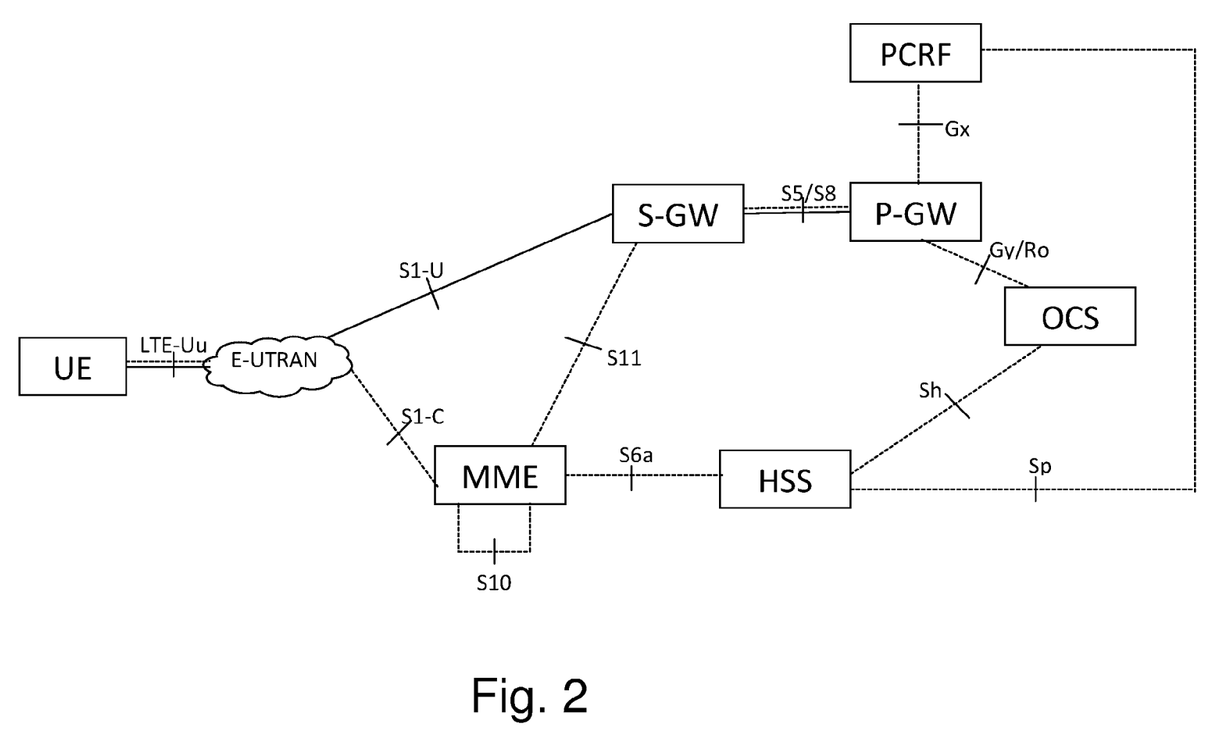
FIG. 2 shows a network architecture according to an embodiment of the present invention.
Figure 3A:
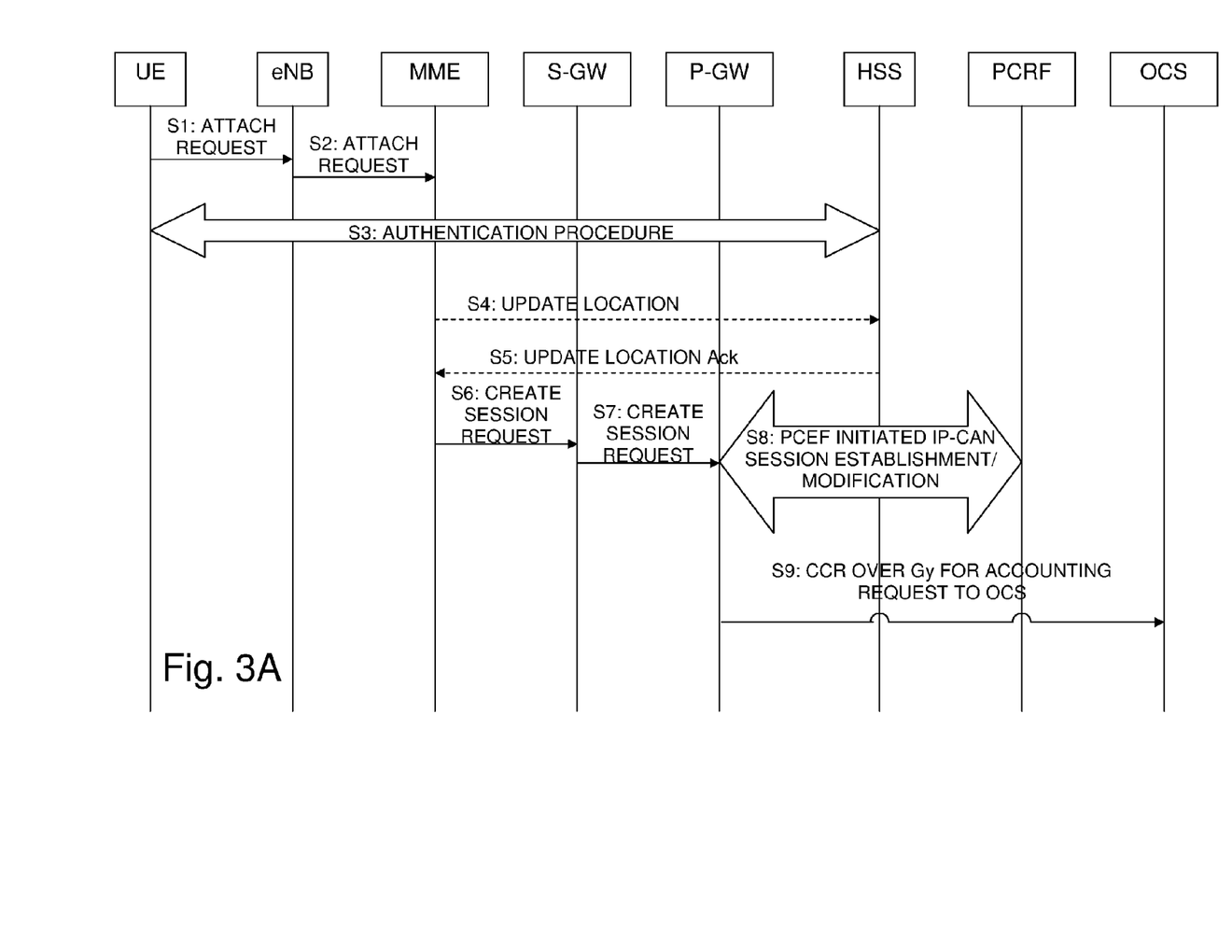
FIGS. 3A and 3B show a signaling flow according to an embodiment of the present invention.
Figure 3B:
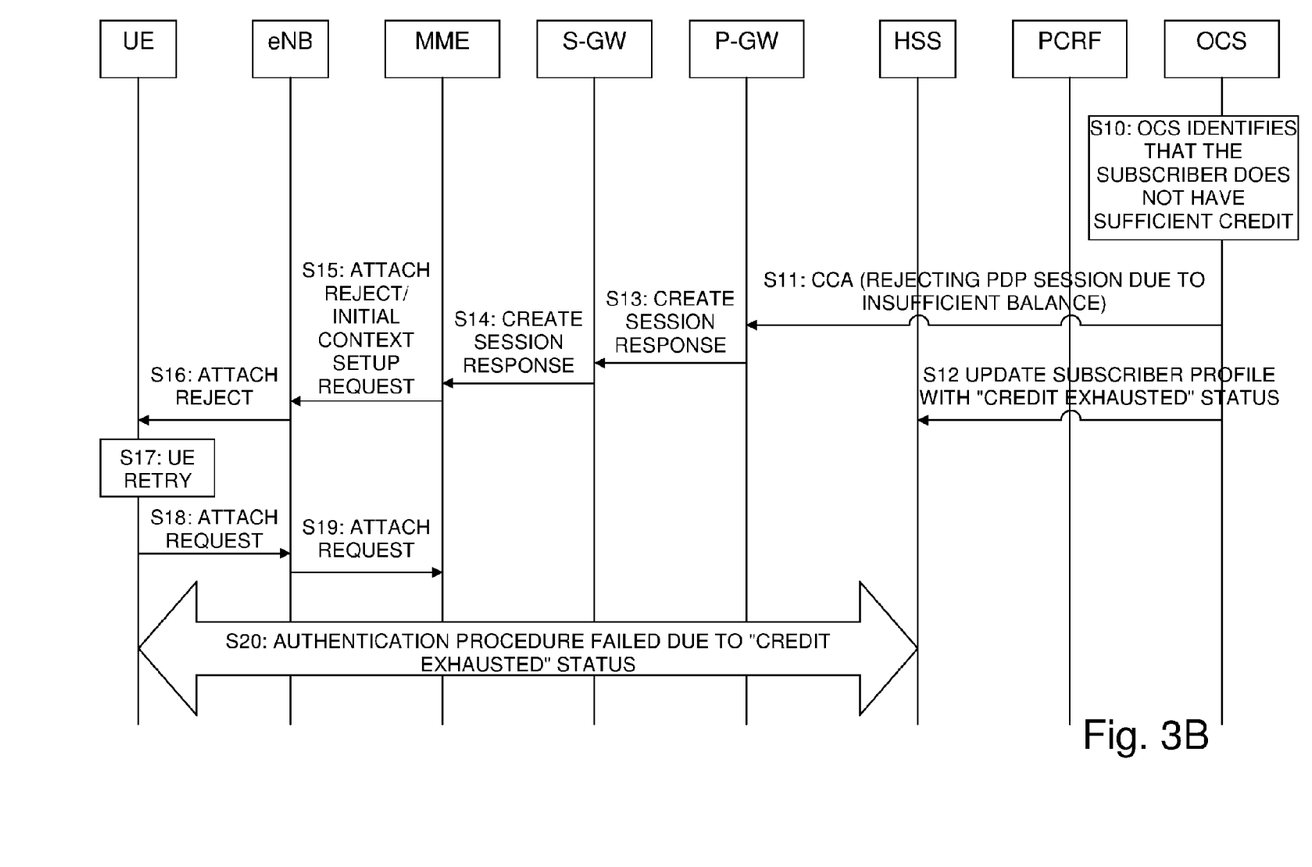

FIG. 2 illustrates a basic network architecture according to an embodiment of the present invention, wherein some network nodes involved in a session establishment procedure described above in connection with FIGS. 4A and 4B and described in the following in connection with FIGS. 3A and 3B are shown. Furthermore, also the reference points (interfaces) as defined by 3GPP between the network nodes are illustrated. It is noted that dotted lines represent signaling plane, and solid lines represent user plane.

A UE is connected to E-UTRAN (i.e., to an eNB) via reference point LTE-Uu. A MME (Mobility Management Entity) is connected with E-UTRAN via reference point S1-C. A S-GW (Serving Gateway) is connected via the reference point S1-U, and with the MME via reference point S11. The S-GW is connected with a Packet Data Network Gateway (P-GW) via reference points S5/S8. The P-GW is connected with a Policy Charging and Rules Function (PCRF) via reference point Gx, and with the Online Charging system (OCS) via reference points Gy/Ro. Reference point S10 indicated at the MME is a reference point between MMEs for MME relocation and MME to MME information transfer.

The MME is further connected with a Home Subscriber Server (HSS) via reference point S6a. The HSS is connected with the OCS via a reference point Sh, and is connected with the PCRF via reference point Sp.

The HSS shown in FIG. 2 may be the HSS 1 described above in connection with FIG. 1A, and the OCS shown in FIG. 2 may be the OCS 2 described above in connection with FIG. 1B.

It is noted that FIG. 2 only shows an example for a network architecture in which the arrangement according to embodiments of the present invention can be applied. That is, other architectures including more, less or other network nodes and/or interfaces or reference points are possible Moreover, it is noted that the HSS 1 is an example for a first apparatus and the OCS 2 is an example for a second apparatus of a system according to more general embodiments of the present invention.

FIGS. 3A and 3B show a call flow according to an embodiment of the present invention, which illustrates the solution behaviour described above. In this call flow, it is assumed that a subscriber tries to request for a service but that his credit is not sufficient for a certain service, i.e., his credit is exhausted for the certain service.

It is noted that processes S1 to S11 are basically the same as processes P1 to P11 described above in connection with FIGS. 4A and 4B. That is, in S1, an UE sends an attach request to an eNB, which forwards the attach request to an MME. In response to this, an authentication procedure is carried out between the HSS and the UE in S3. If this authentication procedure was successful, the process continues with an update location in S4, which is sent from the MME to the HSS, which responds with an update location ack (acknowledgement) in S5. Thereafter, a create session request is sent from the MME to an S-GW in S6, which forwards the create session request to a P-GW in S7. Thereafter, a PCEF initiated IP-CAN session establishment (or modification) is carried out between the P-GW and a PCRF in S8.

Thereafter, an accounting validation procedure is carried out. In S9, the P-GW sends a credit control request (CCR) to the OCS. In S10, the OCS identifies that the subscriber does not have sufficient credits for a certain service, i.e., his credits are exhausted for a certain service. Hence, in S11 a negative response, namely a credit control answer (CCA) rejecting the PDP session due to insufficient balance is sent to the P-GW. In S12, the OCS updates the HSS with "credit exhausted" status for the subscriber, that is, the OCS sends a corresponding message to the HSS so that the HSS can update the subscriber profile in the HSS with "Credit exhausted" status.

That is, in more general terms, the apparatus such as the OCS detects the status of the subscriber upon receiving a request during a session establishment of the subscriber, as indicated by S9 and S10 mentioned above, for example.

In S13, the P-GW sends a create session response to the S-GW, which is forwarded to the MME in S14, wherein the response indicates a rejection. Thus, in S15 the MME sends an attach reject/initial contest setup request to the eNB, which in turn sends an attach reject message in S16 to the UE.

Thereafter, it is assumed that the subscriber tries again to request the service (or even another service for which credit is required). That is, in S17, the UE performs a retry. Hence, in S18 an attach request is sent to the eNB, which forwards the attach request to the MME in S19, similar to S1 and S2. Thereafter, an authentication procedure between the UE and the HSS is started in S20. In this case, the HSS knows the credit of the subscriber is exhausted due to the message sent in S12. Hence, the HSS rejects the request. That is, the authentication procedure fails due to the "credit exhausted" status registered in the HSS.

Thus, once the HSS know the "credit exhausted" status of the subscriber, the subsequent processes (S4 to S16 in FIG. 3) are no longer required. Hence, the network load is reduced and also the processing load on the corresponding network elements is reduced.

As mentioned above, as soon as the OCS detects or knows that the subscriber has credit again, it will correspondingly inform the HSS. Then, the "credit exhausted" status in the HSS will be canceled or removed, so that then the regular procedure can be carried out.

Thus, according to certain embodiments of the present invention, the following advantages can be achieved:

Operators can optimize usage of the core network resources by early detection of subscriber "credit exhaustion".

Most of the network elements are dimensioned based on the PDP session supported and network traffic load. By removing repeated error scenario handling, operator will be able to maximize the network throughput and optimize in terms of cost.

Network operator growth projections are more streamlined for mapping usage to revenue realization.

It is noted that the embodiments and the present invention in general is not limited to the specific examples given above.

For example, in the embodiment described in connection with FIG. 2, the OCS sends the message including the "credit exhausted" status when such a status is detected after an attempt for an IP-CAN establishment procedure (S8). However, alternatively, a message including the "credit exhausted" status may be sent independently from an authentication procedure. That is, when the OCS detects that the credit of the subscriber is exhausted (for example when at the end of a previous successful session the credit is exhausted), the OCS may immediately send such a message to the HSS.

The controllers 11 and 21 of the HSS 1 and the OCS 2, respectively, may comprise a processor and a memory (not shown), wherein the memory may comprise programs by means of which the processor may carry out—together with the interface and other means, if necessary—the functions and procedures described above.

Furthermore, in the embodiments described above, a "credit exhausted" status was described as an example for a certain status of a subscriber, in response to which an authentication request would already be rejected at the HSS. However, the embodiments and the invention are not limited to this, and other conditions under which the subscriber is not entitled to use a certain service are possible. For example, when there are certain limitations of a service with respect to the age of the subscriber or the time of day or the like, also such conditions could be applied for the above certain status of the subscriber. In this connection it is noted that the apparatus detecting a non-entitlement of a subscriber to a service does not need to be OCS, but can also be PCRF, since it may store some policies of not allowing a particular service to a subscriber (or a group of subscribers) and thus may set a flag similar to "credit exhausted" in HSS.

Moreover, the network element which holds a registration about the above certain status of the subscriber is not limited to a HSS. Instead, other suitable network elements could hold such a registration. For example, also the eNB or the MME could be configured such that they hold the registration and can already reject the request of the subscriber after receiving an attach request as shown in S1 or S2 in FIG. 3.

According to an aspect of certain embodiments of the present invention, a system is provided which comprises a first apparatus and a second apparatus, the first apparatus comprising
- a first interface configured to provide connection to at least a another network element, and
- a first controller, wherein
- the first controller is configured to store information about a certain status of a subscriber, to receive an authentication request via the interface, and to reject an authentication request for the subscriber in case the certain status of the subscriber is valid, the second apparatus comprising
- a second interface configured to provide connection to at least another network element, and
  - a second controller configured to detect a certain status of a subscriber and to establish a notification including information about the certain status of the subscriber, wherein
  - the interface is configured to send the notification to the first apparatus.

According to a further aspect of embodiments of the present invention, an apparatus is provided which comprises
- means for storing information about a certain status of a subscriber,
- means for receiving an authentication request for the subscriber, and
- means for rejecting the authentication request for the subscriber in case the certain status of the subscriber is valid.

According to a another aspect of embodiments of the present invention, an apparatus is provided which comprises
- means for detecting a certain status of a subscriber,
- means for establishing a notification including information about the certain status of the subscriber, and
- means for sending the notification to a network control element of the subscriber.

It is to be understood that any of the above modifications can be applied singly or in combination to the respective aspects and/or embodiments to which they refer, unless they are explicitly stated as excluding alternatives.

For the purpose of the present invention as described herein above, it should be noted that method steps likely to be implemented as software code portions and being run using a processor at a network element or terminal (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above, eNode-B etc. as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined apparatuses, or any one of their respective means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

It is noted that the embodiments and examples described above are provided for illustrative purposes only and are in no way intended that the present invention is restricted thereto. Rather, it is the intention that all variations and modifications be included which fall within the spirit and scope of the appended claims.

The invention claimed is:

1. An apparatus comprising:
an interface configured to provide connection to at least another network element,
and
a controller, wherein the controller is configured to store information about a credit exhausted status of a subscriber, to receive a network authentication request for the subscriber via the interface, and to reject the network authentication request for the subscriber in case the credit exhausted status of the subscriber is valid,
wherein the interface is configured to receive a notification including the information about the credit exhausted status of the subscriber,
wherein the controller is configured to register the information about the credit exhausted status of the subscriber, and
wherein the controller is configured to store the information about the credit exhausted status of the subscriber as an error code.

2. The apparatus according to claim 1,
wherein the credit exhausted status of the subscriber comprises a condition under which the subscriber is not entitled to use a certain service.

3. The apparatus according to claim 1, wherein
the controller is configured to receive a notification including information that the credit exhausted status of the subscriber is no longer valid, and to cancel the information about the credit exhausted status of the subscriber.

4. The apparatus according to claim 1, wherein the controller is configured to register information about the credit exhausted status of the subscriber in a profile of the subscriber.

5. An apparatus comprising:
an interface configured to provide connection to at least another network element, and
a controller configured to detect a credit exhausted status of a non-network authenticated subscriber and to establish a notification including information about the credit exhausted status of the non-network authenticated subscriber, wherein the interface is configured to send the notification to a network control element of the non-network authenticated subscriber,
wherein the controller is configured to detect whether the credit exhausted status of the non-network authenticated subscriber is no longer valid and to establish a notification including information that the credit exhausted status of the non-network authenticated subscriber is not valid, and
wherein the interface is configured to send the notification to the network control element of the non-network authenticated subscriber.

6. The apparatus according to claim 5, wherein the credit exhausted status of the non-network authenticated subscriber comprises a condition under which the non-network authenticated subscriber is not entitled to use a certain service.

7. The apparatus according to claim 5, wherein
the controller is configured to detect the credit exhausted status of the non-network authenticated subscriber upon receiving a request during a session establishment of the non-network authenticated subscriber.

8. A method comprising:
storing information about a credit exhausted status of a subscriber,
receiving a network authentication request for the subscriber,
rejecting the network authentication request for the subscriber in case the credit exhausted status of the subscriber is valid,
receiving a notification including the information about the credit exhausted status of the subscriber,
registering the information about the credit exhausted status of the subscriber, and
storing the information about the credit exhausted status of the subscriber as an error code.

9. The method according to claim 8,
wherein the credit exhausted status of the subscriber comprises a condition under which the subscriber is not entitled to use a certain service.

10. The method according to claim 8, further comprising
receiving a notification including information that the credit exhausted status of the subscriber is no longer valid, and
cancelling the information about the credit exhausted status of the subscriber.

11. The method according to claim 8, further comprising
registering information about the credit exhausted status of the subscriber in a profile of the subscriber.

12. A computer program, embodied on a non-transitory computer readable medium, the computer program, when executed by a processor, causes the processor to perform a method according to claim 8.

* * * * *